Figure 1:
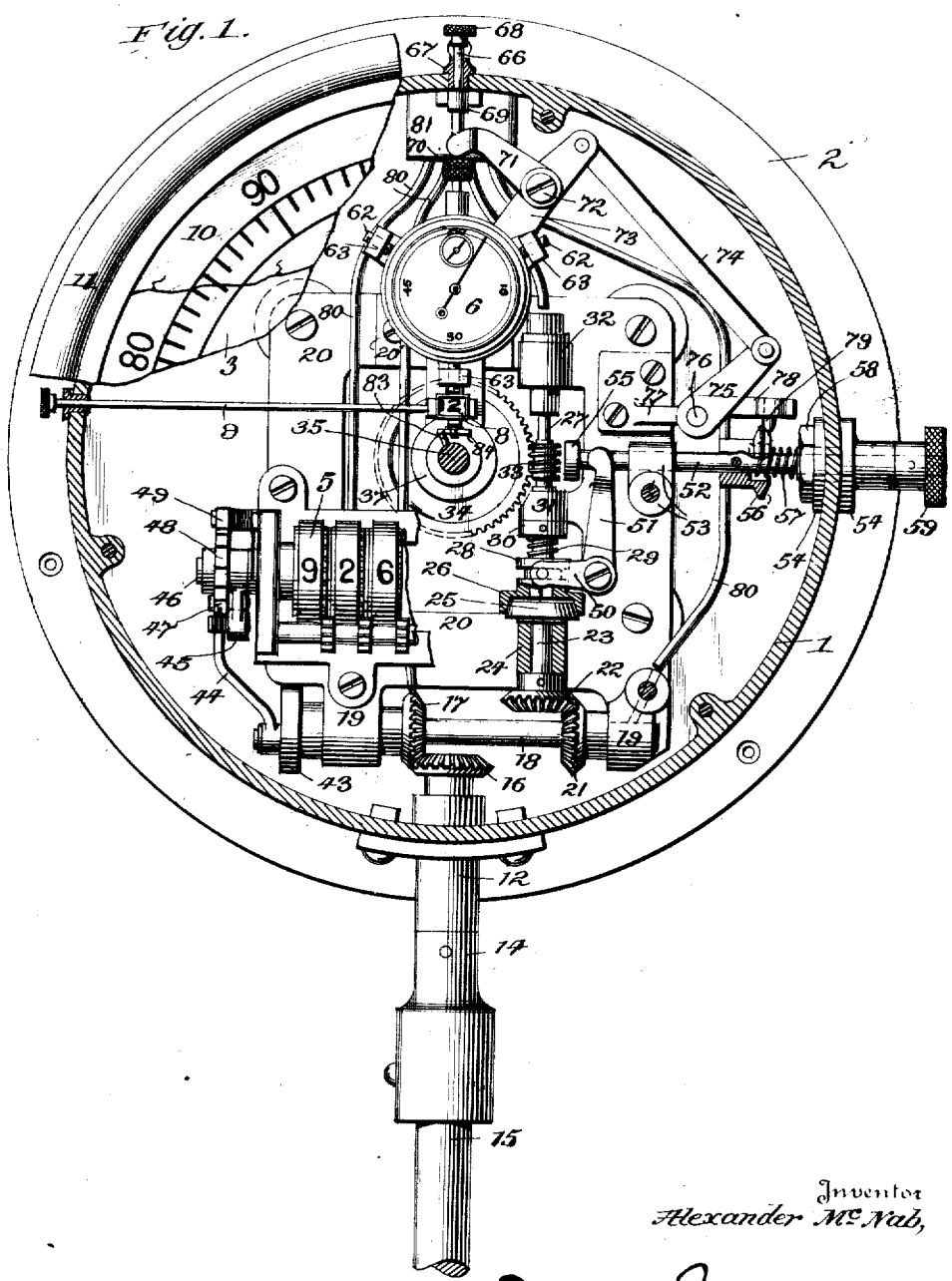

Nov. 30, 1926.  1,608,606

A. McNAB

SHAFT REVOLUTION INDICATOR

Filed May 21, 1919   3 Sheets-Sheet 1

Inventor
Alexander McNab,
By Dodge and Sons
Attorneys

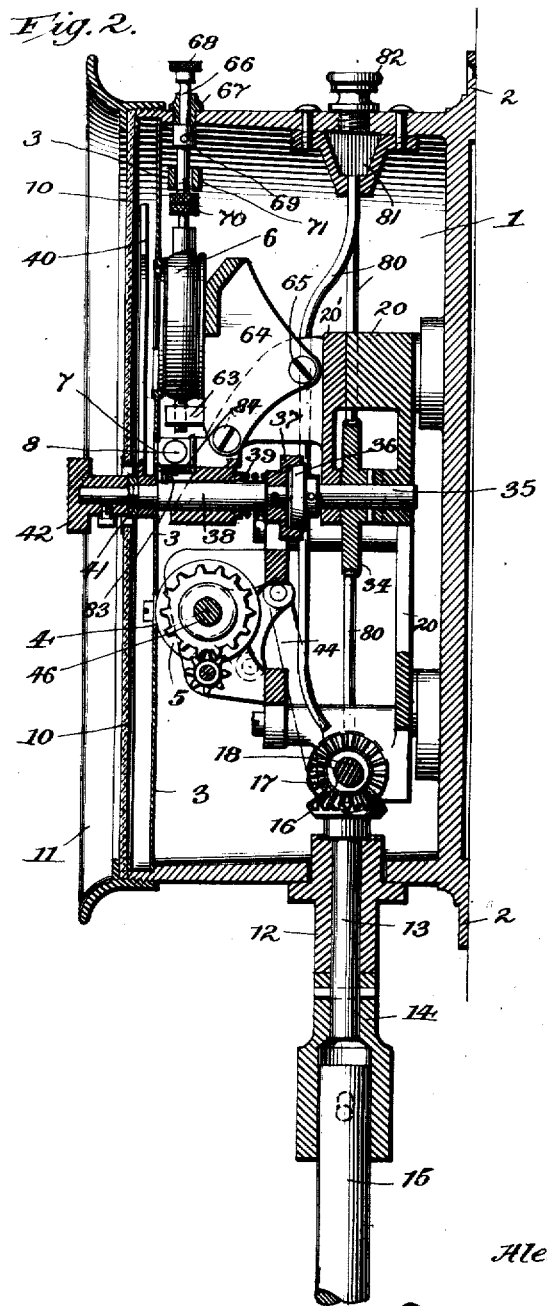

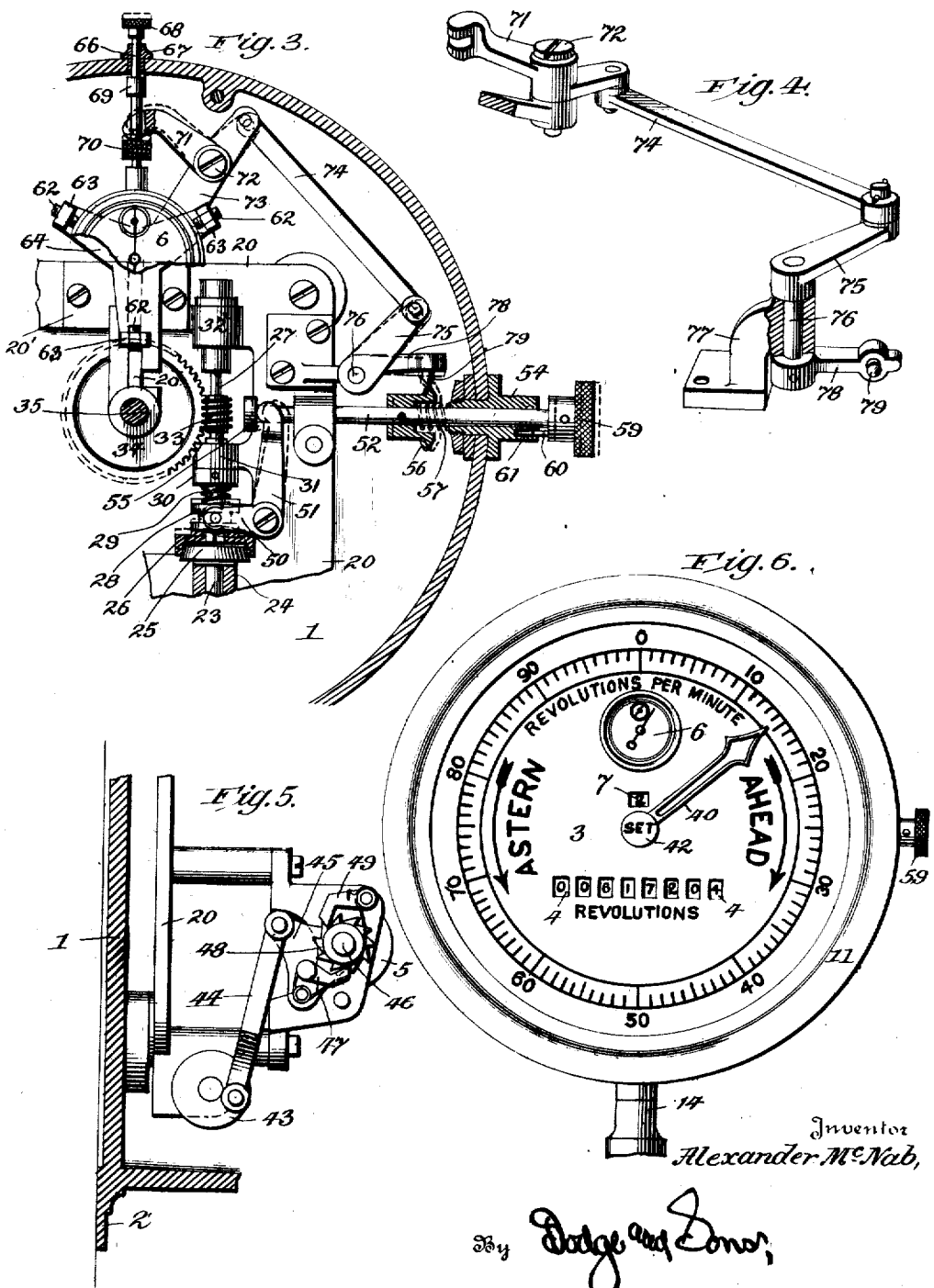

Patented Nov. 30, 1926.

1,608,606

UNITED STATES PATENT OFFICE.

ALEXANDER McNAB, OF BRIDGEPORT, CONNECTICUT.

SHAFT-REVOLUTION INDICATOR.

Application filed May 21, 1919. Serial No. 298,713.

This invention pertains to logometers, as they are commonly known, or shaft revolution indicators, the construction and advantages of which will be hereinafter set forth.

The main object of the present invention is to produce a machine that will indicate the complete number of revolutions the engine shaft may make, be it ahead or astern, and to provide means whereby the indicator hand may be readily reset and likewise arrested at any point in its revolution. A further object of the invention is to provide in conjunction with such hand or pointer, a timing mechanism, the parts being so arranged and corelated that the timing mechanism and the hand may be arrested simultaneously when the shaft by which the hand is driven has made any desired number of revolutions or a part of a revolution. The construction is such that the counter is not arrested but continues to register notwithstanding the hand and the timing mechanism are stopped.

In addition to the total registering mechanism to show the number of revolutions of the shaft, an additional register may be employed which is utilized to indicate the number of complete revolutions which the hand or pointer makes, such register being especially useful in connection with a specific timing operation.

One embodiment of the mechanism is shown in the accompanying drawings, wherein,—

Fig. 1 is a vertical sectional elevation of the apparatus;

Fig. 2 a transverse vertical sectional view;

Fig. 3 a detailed sectional view showing the parts in a position different from that illustrated in Fig. 1;

Fig. 4 a detailed perspective view showing certain of the lever connections interposed between the stop watch or timing mechanism and the operating knob or handle;

Fig. 5 a side elevation showing the actuator for the total register; and

Fig. 6 a front face view of the instrument with the dial and cover plate in full.

In the drawings 1 denotes the casing preferably circular in outline and provided with a flange 2 at its rear for attachment to a fixed portion of the vessel. 3 denotes the dial plate having thereon the legends as they appear in Fig. 6, to-wit, "Ahead" and "Astern," the words "Revolutions per minute" and the graduations from zero to 100. Said dial plate is likewise provided with a series of openings 4 beneath which lie the numbered wheels or disks 5 of the total register or counter. Said disk or plate 3 is likewise provided with an opening adjacent the upper portion thereof through which the face of the stop watch, denoted generally by 6, may be seen, and said plate likewise has a small opening 7 beneath which lies the additional register 8, which register or counter may be reset from without the casing through the operation of a stem or rod 9, as best shown in Fig. 1. The dial or plate 3 is covered by a plate of glass 10 held in position by a bezel 11 which is screwed upon the forward portion of the casing 1. Extending from the casing and preferably the lower portion thereof is a bearing 12 in which is mounted a shaft 13 carrying at its lower end a coupling member 14 designed to have secured thereto a member 15 which is driven from the engine shaft. To the upper end of the shaft 13 there is secured a bevel gear 16 which meshes with a small gear 17 secured upon a shaft 18, said shaft being mounted in bearings 19 formed as downward extensions of a frame member 20, said member in turn being secured to the rear face of the casing and forming a support for the operative parts of the mechanism.

A second bevel gear 21 is secured to shaft 18 and meshes with a small gear 22 fastened to the lower end of a shaft 23 mounted in a bearing 24 formed upon the frame member 20. Said shaft 23 carries at its upper end a cone shaped member 25 forming one element of a clutch, the opposite member of which clutch being designated by 26 and being slidably mounted upon the lower end of a shaft 27 but rotating at all times with such shaft. Said member 26 is provided with a grooved collar or extension 28 and is normally held in engagement with the knob 25 by a spring 29 interposed between the collar 28 and a second collar 30 secured to the shaft and bearing at its upper side against the lower face of the lowermost bearing 31 for the shaft 27. The upper bearing for the shaft 27 is designated by 32. Shaft 27 carries a worm 33 which meshes with a worm gear 34 secured to a shaft 35, see more particularly Fig. 2, said shaft carrying a cone clutch member 36. Said member 36 cooperates with a clutch member 37 secured to the inner end of a shaft 38, said clutch members being normally held in operative relation by a spring 39 surrounding the shaft and tending to force the shaft inwardly. Said shaft passes through an opening in the dial or plate 3 and likewise through a centrally disposed opening formed in the glass cover plate 10. A hand or pointer 40 is mounted upon the shaft and overlies the disk or plate 3 and lies below the cover glass 10. It is held in its position upon the shaft by a nut 41. A knob 42 is secured to the outer end of the shaft and by exerting a slight outward pull upon said knob the clutch members 36, 37 may be disengaged and the shaft 38 rotated in one or the other direction as the case may be when it is desired to reset the pointer or hand 40 to zero. So long as the clutch members 36, 37 are in operative relation, the hand or pointer 40 will travel over the dial.

Shaft 18 has secured to one end thereof, see Figs. 1 and 5, a crank plate or disk 43, and a link 44 is connected thereto and extends upwardly and is pivotally attached to a rocker plate 45 journaled upon a shaft 46 upon which the total registering wheels or disks 5 are mounted. Said register or counter is of the pickup type and a detailed description thereof will not be entered into. The rocker plate 45 carries a spring pressed pawl 47 which cooperates with a ratchet wheel 48 secured to the shaft 46. A locking pawl 49 is provided to prevent retrograde movement of the shaft 46. With this construction no matter whether the shaft be turning so as to propel the ship forward or astern, the shaft 46 will always rotate in one direction and consequently the total number of revolutions will be indicated upon the total registering mechanism.

As before noted, means is provided for disconnecting the clutch, interposed between the hand or pointer 40 and the driving shaft 18. This takes the form of a bell crank lever, the lower arm 50 of which is bifurcated and carries pins which enter into the grooved collar 28 while the upwardly extending arm 51 is likewise bifurcated and straddles a rod 52. Said rod is mounted in bearings 53, 54, and carries at its inner end a stop collar 55 adapted to function with the upstanding arm 51 and to raise the clutch element 26 out of driving relation with the clutch member 25. Said rod 52 has secured to it a double face cam 56 and a spring 57 interposed between said cam and the nut 58, which secures the bearing 54 in place, serves to force the shaft inward and into the position shown in Fig. 1. The outer end of the shaft has secured thereto a knob 59, a knob carrying a pin 60 (see Fig. 3) adapted under certain positions of the parts, to enter an opening 61 formed in the outer end of the bearing 54. Said pin 60, when the knob is drawn out to the full extent, permits the knob and the shaft 52 to be rotated, the inner end of the pin at such time taking against the face of the bearing 54 and preventing inward movement of the shaft. Such position is indicated in dotted lines in Fig. 3. The stop watch or its equivalent, denoted by 6, is preferably mounted in the manner shown, that is to say, it is centered and held by three set screws 62 mounted in outwardly projecting arms 63 formed upon a bracket 64 secured by screws 65 to a suplemental frame member 20', attached to frame 20. The ordinary spindle of the stop watch is removed and is replaced by an elongated spindle designated by 66. Said spindle extends upwardly through a bearing 67 and is provided with a knob 68 through which the watch may be wound, started, and reset. The spindle is normally moved upward by the usual spring (not shown) of the watch mechanism and a stop collar 69 is secured to the spindle and takes against the inner end of the bearing 67. An adjustable collar 70 is also secured to the spindle and is adapted to cooperate with the overlying bifurcated end of an elbow lever 71, see more particularly Figs. 1, 3 and 4. Said elbow lever is fulcrumed upon a stud 72 mounted in an arm 73 which extends outwardly from the supplemental frame 64. The opposite end of the elbow lever is connected by a link 74 to a lever 75 fixed to one end of a shaft 76 mounted in a bracketed bearing 77. To the opposite end of the shaft ther is secured a second lever 78, said lever standing in alinement with the cam 56 and carrying a beveled ended pin 79 adapted to cooperate with the cam.

Inasmuch as the parts are all enclosed, I have provided means for lubricating the various bearings and gearing by small pipes, indicated generally by reference numeral 80, which pipes at their lower ends terminate adjacent the bearings or gears, as the case may be, and open at their upper ends into a pocket or chamber 81, (Fig. 2) secured within the upper part of the casing, access to which is afforded through a screw plug 82.

When the parts in the position shown in Fig. 1, the driving clutch for operating the hand is in working position, and as the propeller shaft rotates in one or the other direction, motion will be imparted to the shaft 18 and consequently to the total revolution counter or register. The shaft 27 will also be driven, and as a consequence, motion imparted to the worm wheel 34, shaft 35, shaft 38, through clutch 37, and to the hand 40. The engineer can then by watching the hand, ascertain for a certainty first, the direction in which the shaft is rotating, and the speed thereof. Where turbine engines are used such an apparatus as herein set forth is particularly useful inasmuch as there are no operating parts of the engine exposed by which the engineer may determine the direction of rotation of the propeller shaft. When it is desired to obtain the R. P. M. of the propeller shaft, the operator pulls out the knob 59 (and turns it slightly) which disconnects the driving clutch (25—26) of the hand and through the connections above described, to-wit, the lever 75, links 74 and elbow lever 71, will reset the stop watch to zero, assuming that the watch has been brought to stopped condition as, for example, by means of manual operation of the spindle 66. Then by manipulating the knob 42, the hand 40 may be turned back to zero. The knob 59 is then turned so that pin 60 may enter opening 61 and the rod 52 is drawn in by spring 57 thereby causing a reengagement of the driving clutch and simultaneously therewith the stop watch is started so that both the hand 40 and the watch are then running. When the hand 40 has traveled the desired number of spaces over the dial, knob 59 is again pulled out and slightly turned so that the pin 60 will hold it in its locked out position, thereby arresting the movement of the hand 40, and likewise stopping the time piece or stop watch. By comparing the number of revolutions the shaft has made with the time interval denoted by the watch, the engineer will know exactly how many revolutions per minute the propeller shaft is making. If desired the watch may be allowed to run the full period of a minute and then the parts operated so as to stop both the hand 40 and the watch. It is then evident without any calculation at all that the engineer will know by merely looking at the hand, how many revolutions the shaft has made in the interval of a minute. In maneuvering battle ships a given speed within a given time interval is often essential and the engineer can, by merely looking at the instrument and manipulating the same in the manner above set forth, determine exactly the speed of the propeller shaft within a given time interval and likewise determine whether the shaft is rotating to propel the vessel ahead or astern.

The register or counter 8, heretofore referred to, is actuated by a pin 83 extending outwardly from the shaft 38, said pin coacting with the usual star wheel 84 of the counter. This additional register or counter will show the number of revolutions that the shaft 38 makes, and is particularly useful when it is desired to time the rotation of the shaft. In other words, if the hand 40 makes more than one complete revolution, the register will show that it has made a complete revolution and the hand will indicate in conjunction with the dial the additional number of revolutions of the propeller shaft.

As before noted, this register is of the set-back type and may be reset from without the casing through the manipulation of the rod 9. When the vessel is not being maneuvered the hand 40 may be allowed to remain stationary and its driving parts brought to rest by merely pulling out the rod 52 through the knob 59 and locking it in such outward position, thus releasing the driving clutch 25, 26 and saving the parts from wear. The total register will, however, continue to operate so long as the propeller shaft is moved.

The term "stop watch" is employed in a generic sense in the above description and in the appended claims, and the claims are to be construed in the light of such meaning.

What is claimed is:—

1. In a shaft revolution indicator, the combination of a graduated dial, a hand associated with the dial, means operable by the shaft for moving the hand to indicate shaft revolutions and including a clutch, a stop watch having a reciprocable controlling spindle, a handle, means operable by movement of the handle in one direction to release the clutch and by movement of the handle in the opposite direction to restore the clutch to effective condition and means operable by movement of the handle in either direction to depress and release the watch spindle.

2. In a shaft revolution indicator, the combination of a dial graduated to show shaft revolutions, a hand associated with the dial, means operable by the shaft for moving the hand to indicate shaft revolutions and including a clutch, a stop watch having a reciprocable controlling spindle, a reciprocable rod, means operable by movement of the rod in one direction to release the clutch and by movement of the rod in the opposite direction to restore the clutch, a device having a one-way connection with the watch spindle to depress the same and including a lever with one end adjacent said rod, and a double ended cam on said rod to actuate and release said lever when moved past the same by movement of said rod in either direction.

3. In a shaft revolution indicator, the combination of a graduated dial, a hand overlying the dial, means operated by the shaft for moving the hand to indicate shaft revolutions and including a clutch, a stop watch having a controlling spindle, a rod, means operable by movement of the rod in one direction to release the clutch, a cam secured to the rod, an elbow lever having one arm which coacts with the watch spindle, a link extending from the opposite end of the lever, a pair of interconnected levers connected at one end with the link and having a pin at the other end to coact with said cam, whereby upon proper movement of the rod the clutch controlling the hand will be released and the watch stopped.

In testimony whereof I have signed my name to this specification.

ALEXANDER McNAB.